April 20, 1965    H. L. OLSON ETAL    3,179,277
FRY PAN EXTENSION
Filed March 7, 1963    3 Sheets-Sheet 1

INVENTORS.
Henry L. Olson
Philip E. Willman
BY
Robert W. Fahrbach
Attorney

April 20, 1965 H. L. OLSON ETAL 3,179,277
FRY PAN EXTENSION
Filed March 7, 1963 3 Sheets-Sheet 2
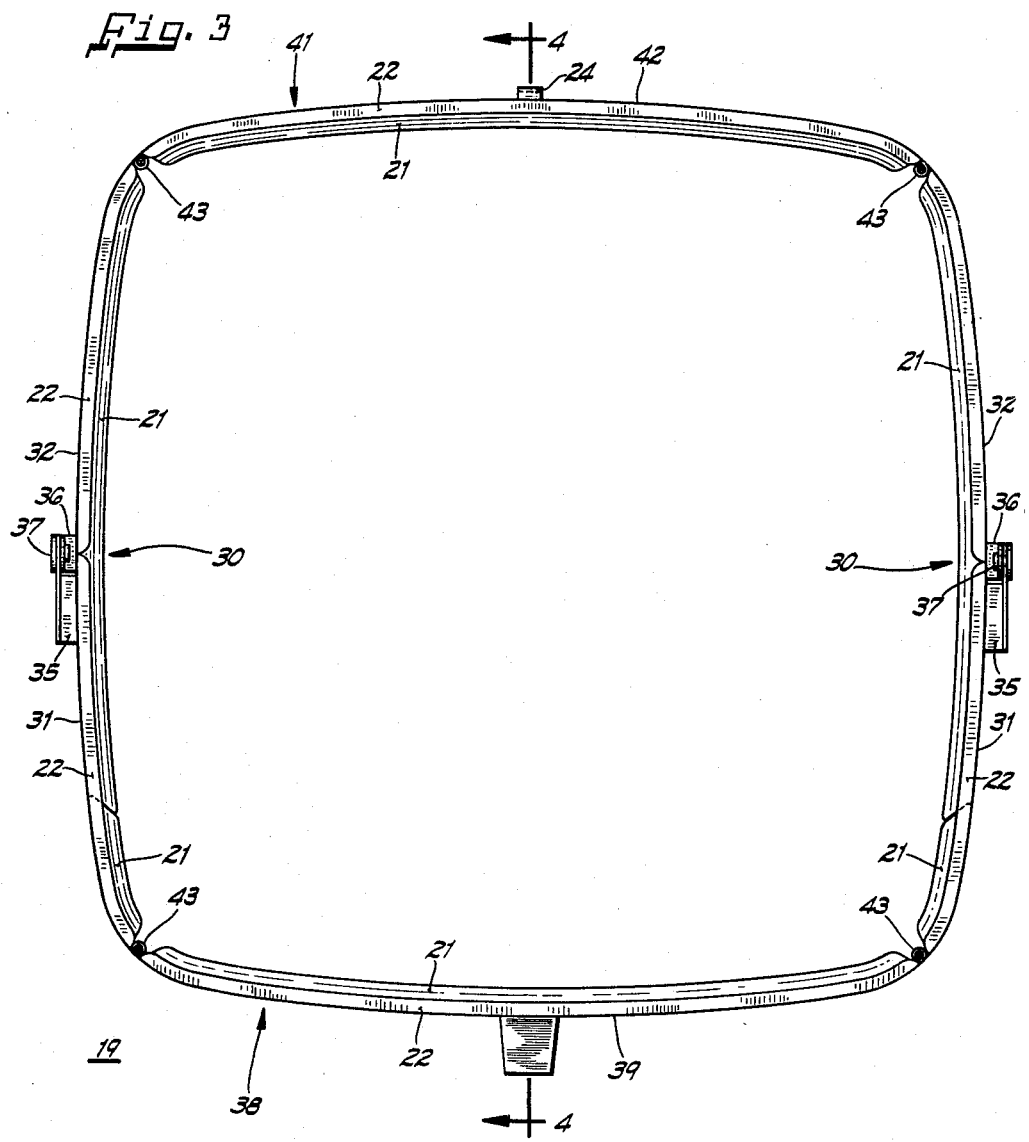
INVENTORS.
Henry L. Olson
Philip E. Willman
BY
Attorney April 20, 1965  H. L. OLSON ETAL  3,179,277
FRY PAN EXTENSION
Filed March 7, 1963
3 Sheets-Sheet 3
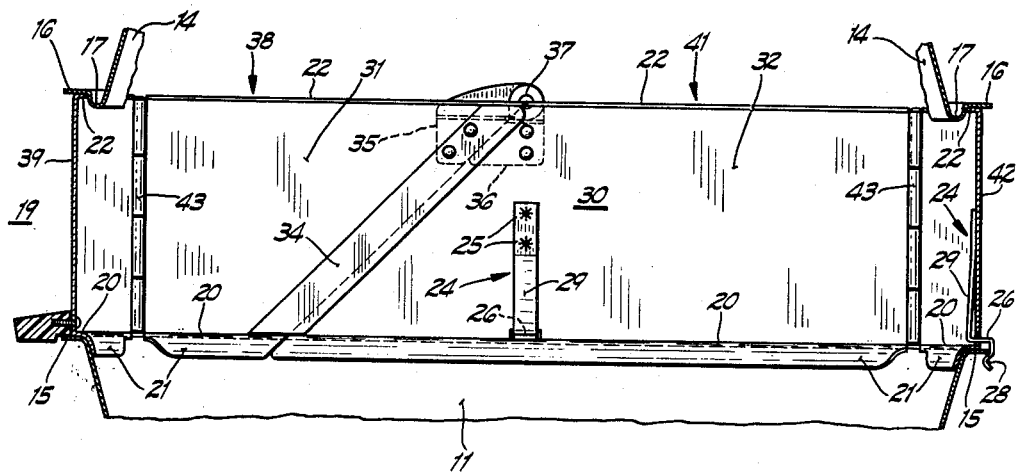
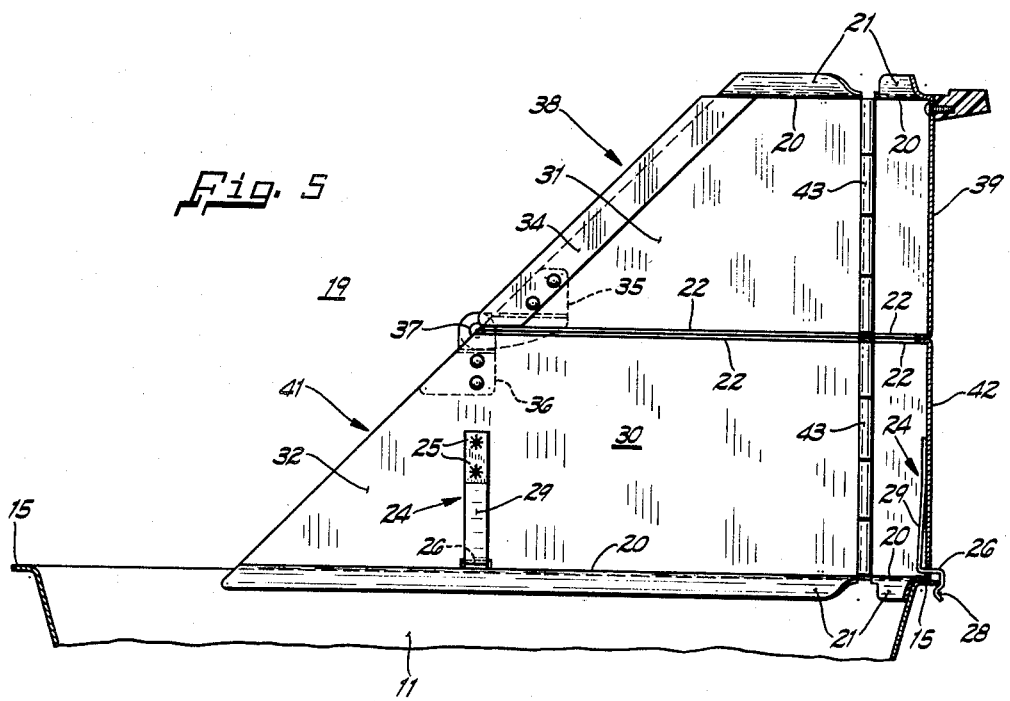
INVENTORS.
Henry L. Olson
Philip E. Willman
BY
Attorney 3,179,277
FRY PAN EXTENSION
Henry L. Olson, West Dundee, and Philip E. Willman, St. Charles, Ill., assignors to McGraw-Edison Company, Milwaukee, Wis., a corporation of Delaware
Filed Mar. 7, 1963, Ser. No. 263,561
6 Claims. (Cl. 220—4)

This invention pertains to an extension for a cooking vessel and is more specifically, but not exclusively, adaptable to an automatic fry pan.

The utility of a food preparing vessel would often be enhanced if in addition to its principal uses it could handle larger items or could be used for more purposes. A vessel such as a fry pan usually has a greater capacity than that imposed by the restricted volume of the vessel available with its regular cover when used for food preparation requiring an enclosed space.

The device of the present invention can be used with any cooking vessel, but is particularly adapted to be used with an automatic fry pan to effect an increase of the enclosed volume affording greater capacity for perparing larger or irregularly shaped articles of food in a manner requiring an enclosed vessel. In addition, by pivotally interconnecting the portions forming the extension of the side walls, flexibility is added to the unit enabling its use as a spatter shield about a portion of the periphery of the rim of the pan when using the fry pan in an uncovered condition, and also making it possible to fold the extension into a compact size that may be stored within the covered pan.

It is an object of this invention to provide an accessory for a cooking vessel that will add to the flexibility of use and increase the useful capacity of such vessel.

It is another object of this invention to provide an extension for food preparing vessel that will provide an increased volume within the enclosed space.

It is a further object of this invention to provide an extension that will alternatively afford a spatter shield about a portion of the periphery of the vessel when used as an open container.

It is also an object of this invention to provide a fry pan extension that can be reduced to a small compact volume for convenient storage.

These and other objects and advantages of this invention will become apparent from the following description when taken in connection with the accompanying drawings wherein—

FIG. 3 is a plan view of the extension of FIG. 1;

FIG. 4 is a section view of the extension along line 4—4 of FIG. 3, with broken away portions of the pan and cover shown in association therewith; and FIG. 5 is a view similar to FIG. 4 with the forward portion of the extension folded back to overlie the rearward portion.

Figure 1:
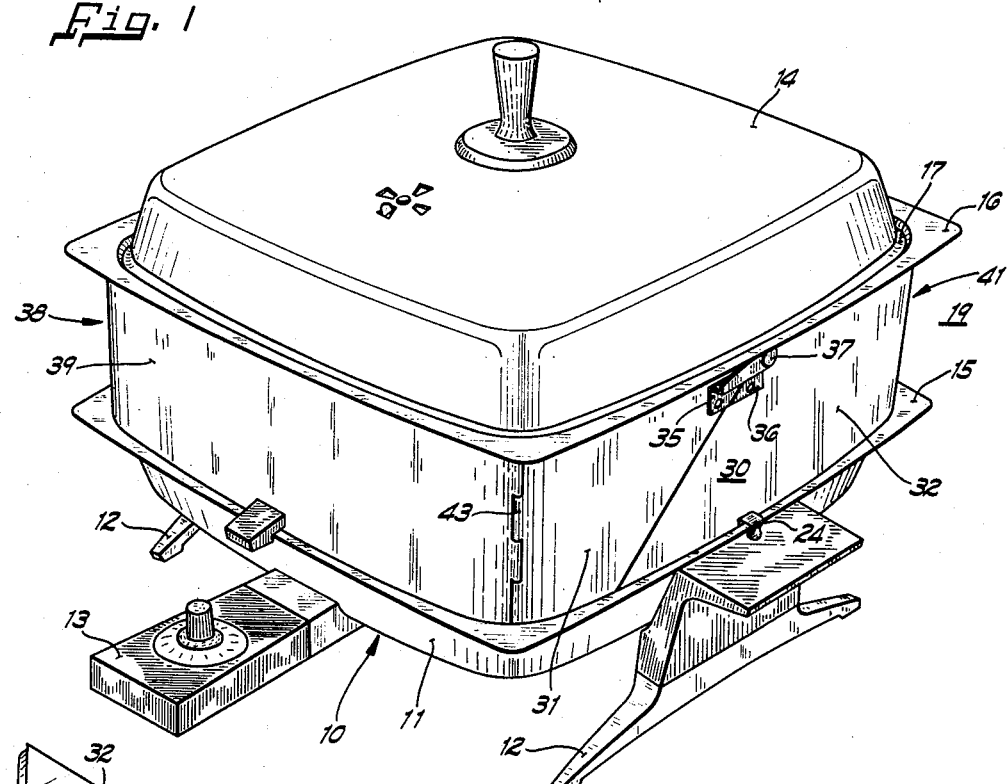
FIG. 1 is a perspective view of a fry pan and the extension of this invention.

Referring to FIG. 1, an automatic fry pan 10 is shown having a pan 11 with supporting legs 12 and a control 13. The cover 14 is designed to be supported by abutting contact between the laterally extending lip 15 about the rim of the pan and the peripheral lip 16 of the cover with the depressed portion 17 of the cover which adjoins the rim of the pan 11 providing alignment. As illustrated, an extension 19 is supported on the rim of the pan 11 and in turn supports the fry pan cover 14 thereabove. As can best be seen in FIG. 4, the extension 19 presents a generally downwardly facing lower peripheral surfaces 20 that abut the rim of the pan 11 and a series of downwardly depending flange portions 21 which abut the interior surface of the pan side walls to align the extension and pan. The cover 14 is supported on an upper turned surface 22 of the extension along a part of the same lower peripheral surface of the cover lip 16 which would be supported by the pan lip 15 in the absence of the extension 19 with the depression 17 in the cover performing the same alignment function as when supported directly on the pan 11.

At either side and at the rear of the extension 19 are found spring clips 24 which are secured by spot welds 25 to the interior surface of the extension wall. A horizontal lower part 26 of each clip extends through a slotted opening in the extension wall with the terminal portion therebelow having an inwardly turned portion 28 which engages the lip 15 laterally extending from the pan rim and releasably connects the extension 19 to the pan 11. The vertically extending portion 29 of the clip adjacent the inner extension wall surface biases the lower outwardly extending portion of the clip inwardly toward the extension wall to retain the clip in engagement with the pan.

Figure 2:
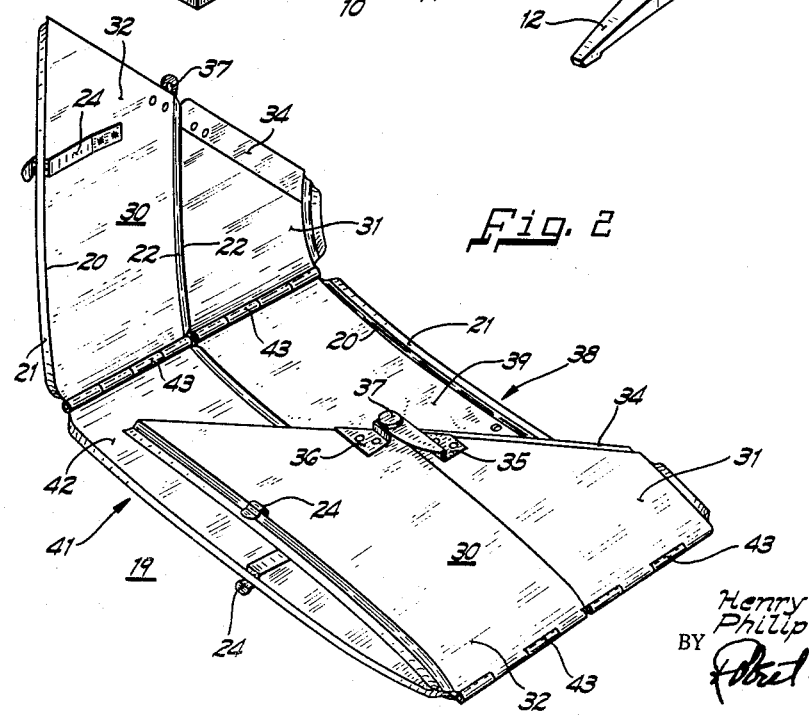
FIG. 2 is a perspective view of the extension of this invention in a partially folded condition.

Each transverse side 30 of the extension 19 is formed of two pieces 31, 32 with the division ocurring along a line extending downwardly and forwardly from a point bisecting the upper surface 22 of the respective side member 30. To assure a continuous, uninterrupted wall when the extension is in the position shown in FIGS. 1 and 4, a flange 34 is provided which overlies the junction between the side member portions 31, 32 and is secured to the respective forward side member 31. Hinge plates 35, 36 at either side are respectively connected to the front and rear members 31, 32 and interconnected for pivotal movement about a pin 37 to afford pivotal action between the forward extension portion 38, including the front wall 39 and side wall portions 31, and the rearward extension portion 41 including the rear wall 42 and side wall portions 32 about an axis lying in the plane defined by the surfaces 22, and bisecting the upper side wall surfaces 22. By pivoting the forward extension portion 38 about the axis established by the pins 37, the extension 19 may be placed in the condition shown in FIG. 5 wherein a shield is provided at the rear and along a portion of each transverse side. The sides of the extension are hinged to the respective adjoining side at each nominal corner or more specifically, by forming a double leaf hinge along the vertical margins or adjoining sides at the center of the curved surface joining such adjacent sides. In the pivoted position of FIG. 5, the pivot axes at either end of the side walls 30 are oriented along a common axis. When the extension is disengaged from the pan, as shown in FIG. 2, the side walls may be pivoted inwardly toward one another. As seen in FIG. 2, one side wall 30 is folded to a position overlying the vertically aligned front wall 39 and rear wall 42 and upon similar folding of the other side wall to a position of overlying relation, the extension structure is reduced to a size which will readily fit within the covered fry pan for convenient storage.

Although but one embodiment has been shown and described, it will be apparent that various changes and modifications may be made therein without departing from the spirit of the invention or from the scope of the appended claims.

What is claimed is:

1. In combination with a covered pan, an extension comprising an upwardly extending wall supportingly engaged by the rim of said pan along a lower marginal portion of said extension wall and presenting an upper marginal peripheral surface generally parallel to said rim and adapted to supportingly contact said fry pan cover to form an enclosed vessel, said extension wall being formed of two portions hingedly interconnected about a transverse axis coinciding with and bisecting said upper marginal surface of said extension wall, one of said wall portions, when said cover is removed, being pivotable about said axis to a position of vertically aligned overlying relation with respect to the other of said wall portions to form a single wall extending upwardly above at least one-half the rim of said pan.

2. A fry pan extension comprising a wall having a first condition wherein a substantially continuous wall is formed between a generally downwardly facing surface for supportingly engaging the rim of a fry pan and an upper peripheral surface, said surfaces being substantially parallel, said extension wall being formed of two portions hingedly interconnected about a transverse first axis coinciding with and bisecting said upper peripheral surface whereby one of said wall portions may be pivoted about said axis to a second condition wherein one of said wall portions overlies the other of said wall portions to form a single upwardly extending wall structure above at least half of the rim of said pan, each of said wall portions having a pivotal connection subdividing said portion, said pivotal connections being disposed about a common second axis when said wall is in said second condition.

3. A fry pan extension comprising a wall having a first condition wherein a substantially continuous wall is formed between a generally downwardly facing surface for supportingly engaging the rim of a fry pan and an upper peripheral surface, said surfaces being substantially parallel, said extension wall being formed of two hingedly interconnected portions with said hinge connection being about a transverse axis coinciding with and bisecting said upper peripheral surface whereby one of said wall portions may be pivoted about said axis to a second condition wherein said one of said wall portions overlies the other of said wall portions to form a single upwardly extending wall structure above at least one-half of the rim of said pan, each of said wall portions being subdivided into three subportions by pivotal interconnection with second and third pivot axes established by one wall portion being respectively coaxial with the pivot axes of the other of said wall portions when said wall is in said second condition whereby said wall subportions may be folded about said second and third axes to a generally overlying third condition for convenient storage.

4. In combination with a fry pan of generally rectangular configuration an extension comprising a wall having a lower surface portion for supporting engagement with the rim of said fry pan, said wall formed of two pairs of confronting side portions with each of said side portions hingedly connected at each end to the adjoining side portion to form a continuous wall upwardly extending from the rim of said pan when disposed in a first condition, one pair of said confronting side portions each being divided into two parts and pivotally connected to one another about a first common axis coincident with and bisecting the upper edge of the associated side portion whereby one part of each said one pair and one side of the other of said pairs of side portions may be pivoted as a unit about said first common axis to a second condition wherein said other pair of said side portions overlie one another to form a single upwardly extending wall surface at one side of said pan, said hinge connections intermediate adjoining side portions lying along second and third common axes in said second condition whereupon said one pair of side portions may be pivoted toward one another to a compact third condition.

5. An extension for insertion between a vessel and the cover therefor comprising a sleeve like wall presenting a lower surface for engaging the rim surrounding the opening of said vessel and an upper marginal surface, substantially parallel to said lower surface and adapted to supportingly receive said cover; hinge connections symmetrically dividing said wall into two pairs of confronting side wall portions, one of said pairs having each wall portion formed by two parts pivotally jointed together about an axis coinciding with and bisecting said upper surface; and means for aligning said wall with said vessel opening.

6. The vessel extension in accordance with claim 5 and further comprising releasable retaining means for securing said wall to said vessel rim.

References Cited by the Examiner
UNITED STATES PATENTS

| 304,111 | 8/84 | Laube | 220—4 |
| 315,196 | 4/85 | Wells | 220—4 |
| 505,364 | 9/93 | MacIntosh | 220—4 |
| 1,304,508 | 5/19 | Petro | 220—4 |

FOREIGN PATENTS 186,874  10/22  Great Britain.

FRANKLIN T. GARRETT, *Primary Examiner.*